(12) United States Patent
McArthur et al.

(10) Patent No.: US 11,215,735 B2
(45) Date of Patent: Jan. 4, 2022

(54) CONSTRUCTION SITE MONITORING SYSTEM AND METHOD

(71) Applicant: United Rentals of Canada, Inc., Toronto (CA)

(72) Inventors: Stirling James Daniel McArthur, Calgary (CA); Philip Claxton, Calgary (CA); Tim Walter, Calgary (CA); Chris Salvador, Calgary (CA); Jay Weber, Calgary (CA)

(73) Assignee: UNITED RENTALS OF CANADA, INC., Toronto (CA)

( * ) Notice: Subject to any disclaimer, the term of this patent is extended or adjusted under 35 U.S.C. 154(b) by 267 days.

(21) Appl. No.: 16/116,739

(22) Filed: Aug. 29, 2018

(65) Prior Publication Data
US 2020/0073013 A1    Mar. 5, 2020

(51) Int. Cl.
*G01W 1/06* (2006.01)
*H04W 4/38* (2018.01)
(Continued)

(52) U.S. Cl.
CPC .............. *G01W 1/06* (2013.01); *H04W 4/025* (2013.01); *H04W 4/38* (2018.02); *H04W 76/11* (2018.02); *H04W 84/18* (2013.01)

(58) Field of Classification Search
CPC ......... G01W 1/06; G08B 25/10; G08B 25/08; G08B 21/182; G01D 21/00; H04W 4/38;
(Continued)

(56) References Cited

U.S. PATENT DOCUMENTS

| 8,600,556 B2 | 12/2013 | Nesler et al. |
| 2005/0131652 A1 | 6/2005 | Corwin et al. |

(Continued)

FOREIGN PATENT DOCUMENTS

WO    WO 2018/089606 A1    5/2018

OTHER PUBLICATIONS

Stojkoska et al., Application of Wireless Sensor Networks for Indoor Temperature Regulation, Published May 25, 2014, International Journal of Distributed Sensor Networks, vol. 2014, Article ID 502419, 10 pp. (Year: 2014).*

(Continued)

*Primary Examiner* — Toan M Le
(74) *Attorney, Agent, or Firm* — K&L Gates LLP

(57) ABSTRACT

A system and method for monitoring one or more environmental conditions at a construction Site. Some embodiments include a system and method for sending a notification to a client device based on a trigger condition. The system may include a computer server including a web server and a database; a Coordinator and Aggregator Gateway (CAG) deployed at the construction site and In communication with the web server and a global position system (GPS) network; and one or more Wireless Sensor Nodes (WSNs) deployed at the construction site and in communication with the CAG, each of the WSNs including one or more sensors configured to measure an environmental condition of the construction site. In some embodiments, one or more of the sensors may be configured to measure one or more of: an ambient temperature of the construction site; a temperature of a wall, a floor, or a ceiling of the construction site; an ambient humidity of the construction site; and a concentration of a gas in the atmosphere of the construction site.

28 Claims, 7 Drawing Sheets

(51) Int. Cl.
  *H04W 84/18*   (2009.01)
  *H04W 76/11*   (2018.01)
  *H04W 4/02*    (2018.01)

(58) Field of Classification Search
  CPC ..... H04W 4/025; H04W 76/11; H04W 84/18;
       H04Q 2209/40; H04Q 2209/823; H04Q
                              9/00; H04L 67/12
  See application file for complete search history.

(56) References Cited

U.S. PATENT DOCUMENTS

2006/0193262 A1   8/2006   McSheffrey et al.
2009/0251314 A1   10/2009  Jiang et al.

OTHER PUBLICATIONS

Gadeke et al., Real-Time Environmental Emission Monitoring on Construction Sites, Date Added to IEEE Xplore: Oct. 16, 2014, 2014 6th European Embedded Design in Education and Research Conference (EDERC), 5 pp. (Year: 2014).*
Abstract of Gadeke et al., Oct. 16, 2014, 1 pp. (Year: 2014).*
Lee et al., Curing Management of Early-Age Concrete at Construction Site Using Integrated Wireless Sensors, Mar. 2014, Journal of Advanced Concrete Technology, vol. 12, pp. 91-100 (Year: 2014).*
Google Search Results, Apr. 14, 2021, 3 pp. (Year: 2021).*
Extended European Search Report for European Application No. 19191612 completed Nov. 29, 2019.
http://pillar.tech/our-technology.php, May 17, 2017.
https://iot.telus.com/en/business/on/campaign/construction?INTCMP=home_learnmore, May 17, 2017.

* cited by examiner

CONSTRUCTION SITE MONITORING SYSTEM AND METHOD

TECHNICAL FIELD

The present disclosure is directed to monitoring systems and methods. More particularly, the present disclosure is directed to monitoring systems and methods for construction sites.

BACKGROUND

The environmental conditions of a construction site are an important factor in constructing a structure efficiently and safely. For example, the temperature and humidity of a construction site may affect the laying and setting of construction materials like concrete and adhesives. Furthermore, construction activities may be contingent on environmental conditions, for example, a certain temperature and humidity.

Construction sites are dynamic environments, and many factors can affect the environmental conditions of a construction site. Weather, construction activities, and the dynamic nature of the construction site itself may affect environmental conditions. For example, enclosing a space by placing windows may increase the temperature and humidity of the space. As a further example, curing of concrete may increase the temperature of a space.

The dynamic nature of construction sites make them difficult environments in which to accurately and reliably measure environmental conditions. For example, the size and composition of a construction site may change as spaces are added (e.g. adding floors, walls, etc.).

Furthermore, a construction site itself may be inhospitable to electronics conventionally used to measure environmental conditions. For example, systems used to monitor construction sites may be subject to physical shocks and/or vibrations inherent in construction activities. Furthermore, there may be a desire to measure environmental conditions of a construction site, in advance of electrical and/or telecommunications service being installed.

There is a general desire for a system to monitor construction site environmental conditions.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and Illustrative, not limiting in scope. In various embodiments, one or more of the above-described problems have been reduced or eliminated, while other embodiments are directed to other improvements.

One aspect of the invention provides a system for monitoring environmental conditions of a construction site, the system comprising: a computer server comprising a web server and a database; a Coordinator and Aggregator Gateway (CAG) deployed at the construction site and in communication with the web server and a global position system (GPS) network; one or more Wireless Sensor Nodes (WSNs) deployed at the construction site and in communication with the CAG, each of the WSNs comprising one or more sensors configured to measure an environmental condition of the construction site; a site configuration record stored in the database, the site configuration record comprising: a unique construction site identifier; a construction site name; a construction site floorplan; GPS coordinates of the construction site; an array of sensor records, each of the sensor records comprising: a WSN identifier identifying the WSN which the sensor is in communication with; a unique sensor identifier; a sensor name; and a location of the sensor on the floorplan; an array of measurement records stored in the database, each of the measurement records comprising: a measurement sensor identifier identifying one of the sensors; a measurement value; a measurement site identifier identifying the construction site; and a date and, time.

In some embodiments, the system further comprises: a client device in communication with the web server; a trigger condition stored in the database, the trigger condition comprising: a trigger sensor identifier identifying one of the sensors; a trigger threshold; and a client device identifier identifying the client device; a monitoring module executed by the web server, the monitoring module configured to send a notification to the client device identified by the client device identifier in the trigger condition if any of the measurement records contain a measurement sensor identifier matching the trigger sensor identifier in the trigger condition, and if the measurement value in the measurement record with the measurement sensor identifier matching the trigger sensor identifier exceeds the trigger threshold in the trigger condition.

In some embodiments, one or more of the sensors may be configured to measure one or more of: an ambient temperature of the construction site; a temperature of a wall, a floor, or a ceiling of the construction site; an ambient humidity of the construction site; and a concentration of a gas in the atmosphere of the construction site.

Another aspect of the Invention provides a method of monitoring, environmental conditions at a construction site, the method comprising: a Wireless Sensor Node (WSN) polling a sensor to generate an environmental measurement; the WSN transmitting the environmental measurement to a Coordinator and Aggregator Gateway (CAG); the CAG comparing the environmental measurement to a threshold; the CAG sending a first notification to a user device and a second notification to a server if the environmental measurement exceeds the threshold; and the server displaying a graphical indicator that the environmental measurement exceeds the threshold, if the server receives the second notification from the CAG.

Another aspect of the invention provides a method of monitoring environmental conditions at a construction site, the method comprising: a Wireless Sensor Node (WSN) polling a sensor to generate an environmental measurement; the WSN transmitting the environmental measurement to a Coordinator and Aggregator Gateway (CAG); the CAG transmitting the environmental measurement to a server; the server comparing the environmental measurement to a threshold; the server sending a notification to a user device if the environmental measurement exceeds the threshold; the server displaying a graphical indicator that the environmental measurement exceeds the threshold if the environmental measurement exceeds the threshold.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
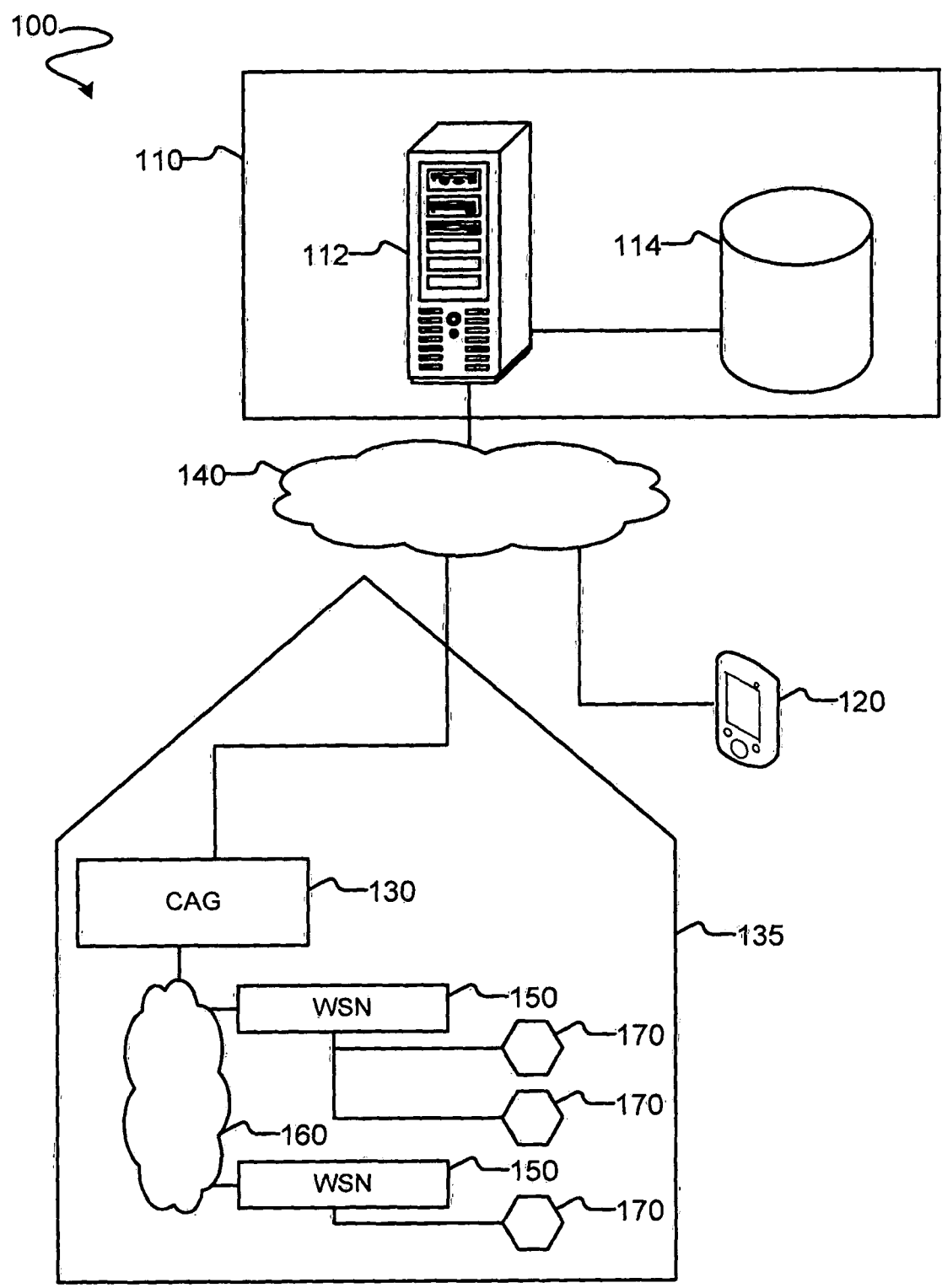
FIG. 1 is a schematic diagram of an embodiment of a system for monitoring environmental conditions of a construction site.

FIG. 1 is a schematic diagram of a construction site monitoring system 100. FIG. 1 depicts a single Coordinator and Aggregator Gateway (CAG) 130 deployed at a single construction site 135. However, it is understood that system 100 may comprise multiple CAGs deployed at multiple construction sites. In some embodiments of system 100, more than one CAG is deployed at a single construction site 135.

System 100 comprises server 110. Server 110 comprises a web server 112 and a database server 114. Server 110 is in communication with one or more client device 120, and one or more CAG 130.

CAG 130 is deployed at a construction site 135. Server 110 may be at any location, or distributed across multiple locations. Client device 120 may be at any location, or comprise multiple devices at distinct locations.

Server 110, client device 120 and CAG 130 are in communication by a suitable electronic communications channel 140. In some embodiments, communications channel 140 comprises the internet, and server 110, client device 120 and CAG 130 connect to the internet either by wired or wireless connection. Examples of wired and wireless internet connections include Ethernet, Wi-Fi and cellular LTE.

Client device 120 may comprise one or more computing devices, for example, laptop computers, desktop computers, mobile phones, tablets, or any other device which comprises a display, an input device, and a communications module capable of sending and receiving data over communications channel 140.

CAG 130 comprises one or more wireless communication modules, at least one of which is capable of sending, and receiving data over communications channel 140. CAG 130 further comprises a location module, for example a GPS module.

System 100 further comprises one or more Wireless Sensor Nodes (WSNs) 150. WSNs 150 are co-located with CAG 130 at construction site 135. CAG 130 is additionally in communication with WSNs 150.

CAG 130 and WSNs 150 are in communication by any suitable electronic communications channel 160. In some embodiments, communications channel 160 comprises a wireless ad hoc network, and CAG 130 and each of WSNs 150 connect to the network wirelessly. An example of a wireless ad hoc network is a wireless mesh network (WMN), wherein each of CAG 130 and WSNs 150 comprises a wireless node in the WMN network.

Where communications channel 140 is different from communications channel 160, CAG 130 may comprise a communications module capable of sending and receiving information over both communications channels 140 and 160, or CAG 130 may comprise a first communications module capable of sending and receiving information over communications channels 140, and a second communications module capable of sending and receiving information over communications channels 160.

System 100 further comprises one or more sensors 170. Each of sensors 170 is in communication with at least one of WSNs 150. In some embodiments, sensors 170 communicate with WSNs 150 by a wired connection. In embodiments where sensors 170 communicate with WSNs 150 by a wired connection, WSNs 150 may also provide power to sensors 170.

Each of sensors 170 may measure any suitable environmental condition. For example, sensors 170 may measure:
 ambient temperature;
 temperature of a wall, floor, or ceiling; and/or
 ambient humidity.

In other embodiments, one or more of sensors 170 may measure:
 concentration of a gas in the atmosphere, for example carbon monoxide, carbon dioxide, methane, or propane;
 the presence or concentration of a conductive liquid, for example water; and/or
 moisture content, for example within a slab of curing concrete.

In addition to environmental conditions, WSNs 150 may measure one or more non-environmental parameters related to the condition and operation of the WSN itself, for example:
 a power source type, for example AC plug or battery;
 a battery level;
 communications connection strength; and/or
 uptime.

In operation, WSNs 150 periodically polls each sensor 170 in communication with the WSN to obtain a sensor measurement from each sensor 170. WSNs 150 also poll any non-environmental parameters. WSNs 150 then transmit the measurements to CAG 130. CAG 130 then transmits the measurements and parameters to server 110 via communications channel 140.

In some embodiments, WSNs 150 may perform an error check on the sensor measurements polled from each of sensors 170. If a sensor measurement fails the error check, then WSNs may transmit an error code instead of the sensor measurement.

Each measurement transmitted from CAG 130 to server 110 may comprise one or more of:

a WSN identifier;
a sensor identifier;
a location at which the measurement was taken;
a measurement value;
a site identifier; and
a date and time.

Not all of the above may be required for each measurement, for example, a sensor identifier is not required for a non-environmental measurement, for example, WSN uptime.

Furthermore, each measurement transmitted from CAG 130 to server 110 may comprise a trigger condition, wherein the trigger condition comprises measurement Identifier, a threshold, and an indication if the threshold has been exceeded.

Multiple measurements may be combined into a single record transmitted from CAG 130 to server 110. A sensor measurement may be stored in a JSON record, for example:

```
"sensors": [
    {
        "sub_id": "2",
        "id": "H",
        "location": "5",
        "value": 23.8
    },
    {
        "sub_id": "2",
        "id": "T",
        "location": "5",
        "value": 20.2
    },
    {
        "sub_id": "0",
        "id": "B",
        "location": "5",
        "thresholds": [
            {
                "zone": "battery",
                "low": 3.4,
                "exceeded": false,
                "high": null
            }
        ],
        "value": 3.6
    }
],
"iot_id": "16243",
"cag_iot_id": "26771",
"site": {
    "id": "E0BgT_ErQgeo7IECdcWvGw"
},
"timestamp": "2018-04-12T15:09:03.181161-0600"
},
"fields": {
    "timestamp": [
        1523567343181
    ]
```

Where CAG 130 comprises a GPS module, the location of each measurement may comprise a GPS coordinate of CAG 130.

Server 110 receives the measurements from CAG 130, and stores the measurements in database 114. Client device 120 may then request one or more measurements from server 110. Server 110 then queries database 114 for any measurements which satisfy the request from client device 120, and transmits the matching measurements to client device 120.

Figure 6A:
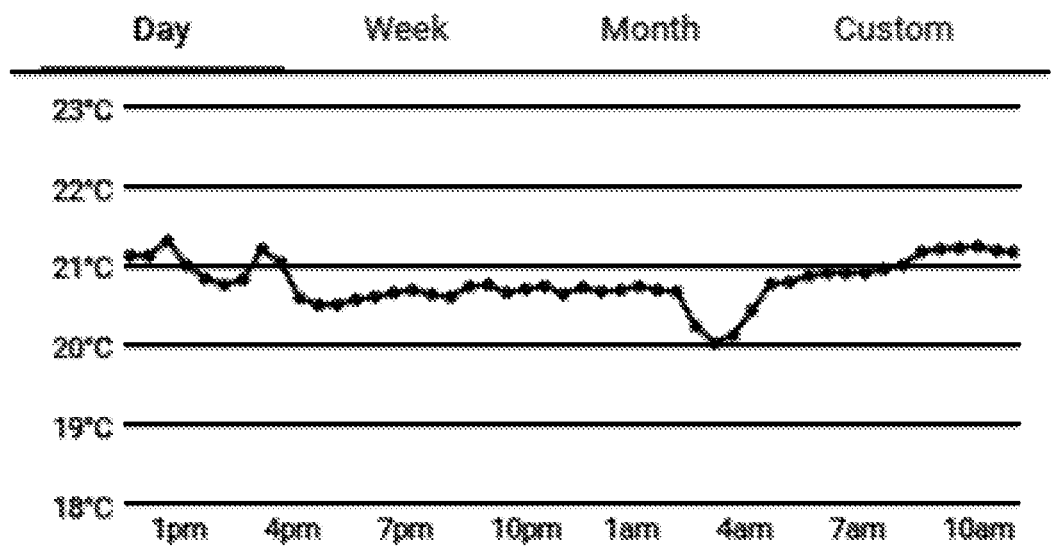
FIGS. 6A and 6B are example charts according to some embodiments of the system.
Figure 6B:
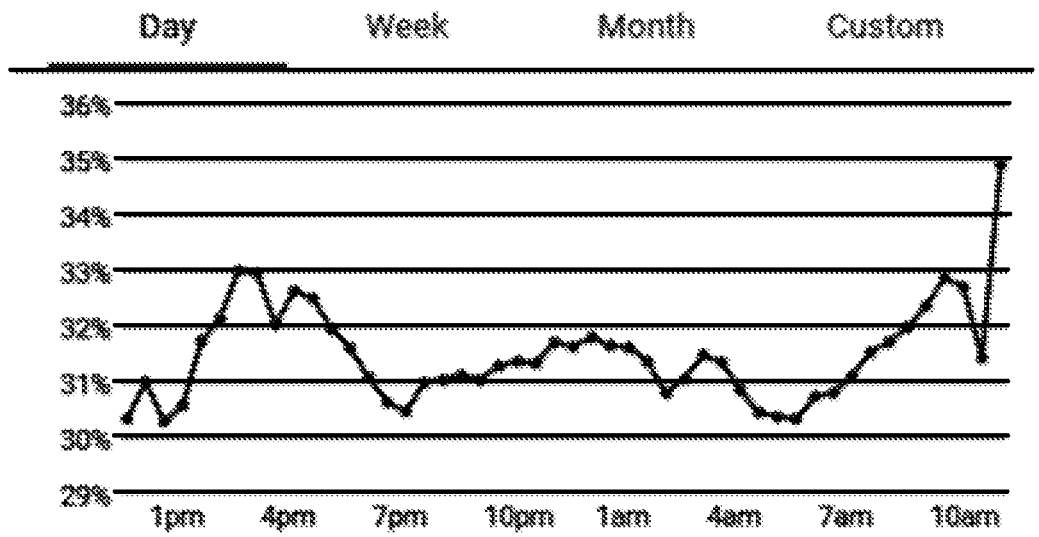

In some embodiments, server 110 may format the measurements before transmitting them to client device 120. For example, server 110 may generate a graphical webpage comprising the measurements, for example a chart graphing environmental measurements versus date and time. FIGS. 6A and 6B are respectively example graphical representation of a temperature sensor measurement and a humidity sensor measurement over a day.

In some embodiments, one or both of server 110 and CAG 130 are configured to monitor sensor measurements, and notify client device 120 upon certain conditions. Examples of conditions include:
a temperature measurement exceeding a threshold;
a temperature measurement exceeding a threshold for a period of time;
a humidity measurement dropping below a threshold;
a humidity measurement dropping below a threshold level for a period of time;
a battery level dropping below a threshold level; and
a WSN losing connection with a sensor for a period of time.

In embodiments where CAG 130 is configured to monitor the sensor measurements, CAG 130 may be further configured to notify server 110 in addition to client device 120.

Figure 2:
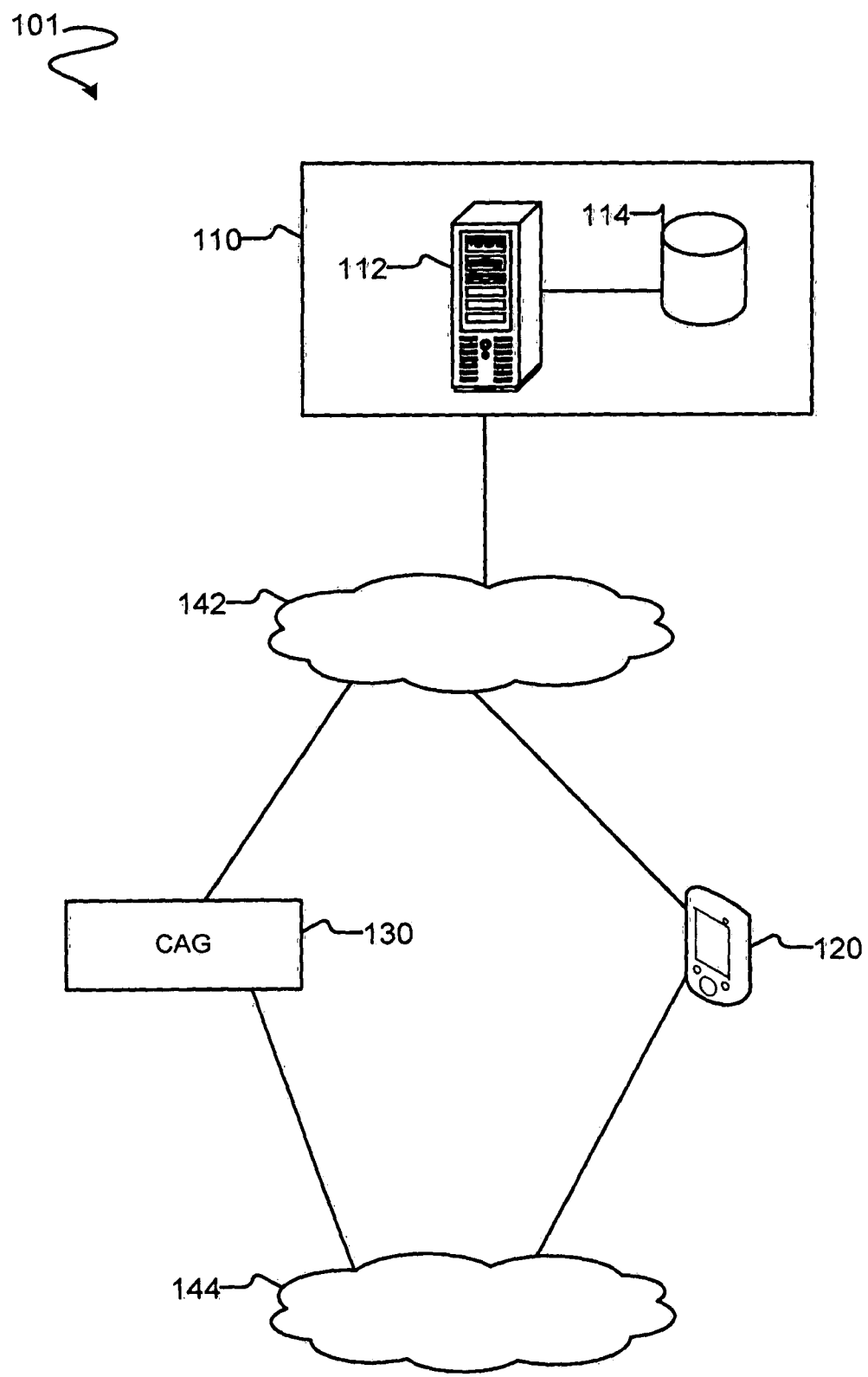
FIG. 2 is a schematic diagram of another embodiment of a system for monitoring environmental conditions of a construction site.

One or both of server 110 and CAG 130 may be configured to notify client device 120 using one of a variety of communications channels and methods. As an example depicted in FIG. 2, CAG 130 is In communication with client device 120 via first communications channel 142 and second communications channel 144. First communications channel 142 may comprise the internet, and second communications channel 144 may comprise a cellular network capable of transmitting short message service (SMS) messages. Where CAG 130 monitors the sensor measurements, CAG 130 may first attempt to contact client device 120 via first communications channel 142, for example via an internet SMS service. If the first contact attempt fails, CAG 130 may then attempt to contact client device 120 via second communications channel 144, for example a cellular SMS service.

In other embodiments, any combination of two or more communications channels may be used to provide redundant communications between one or both of server 110 and CAG 130, and client device 120.

Figure 3:
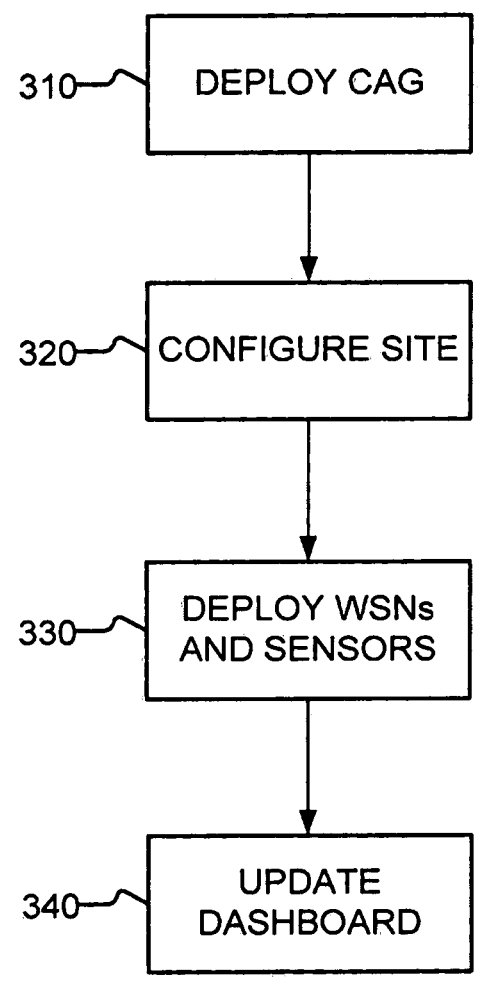
FIG. 3 depicts steps of a method for configuring a system for monitoring environmental conditions of a construction site according to an example embodiment.

FIG. 3 is a method 300 for deploying and configuring construction site monitoring system 100.

Method 300 comprises: step 310 deploy CAG, step 320 configure site, step 330 deploy WSNs and sensors, and step 340 update dashboard.

Step 310, deploying CAG 130, comprises physically installing CAG 130 at a suitable location of construction site 135. A suitable location may be one which: minimizes physical shocks to the CAG, is proximate to a suitable power source, provides access to wireless networks like a GPS network and an LTE network, and provides wireless coverage of locations where WSNs will be installed.

In some embodiments, step 310 comprises installing two or more CAGs at a construction site. Two or more CAGs may be required at a single construction site where no single location is able to satisfy all of the requirements of a CAG. For example, one location may be required to provide access to a GPS network and an LTE network, and another location may be required to provide wireless coverage for the locations where the WSNs will be installed. Where two or more CAGs are required at a single construction site, one of the CAGs may be configured as the master CAG, and the other(s) may be configured as slave CAGs. For example, one or more CAGs may be configured as a wireless repeater node, for, example to extend the wireless network of communications channel 160.

Once CAG 130 is installed at construction site 135 and powered on, CAG 130 will:

connect to the GPS network and receive current GPS coordinates;

connect to communications channel 140; and transmit the current GPS coordinates along with a unique CAG identifier to server 110 via communications channel 140.

If CAG 130 cannot connect to the GPS network, CAG 130 may alternatively be programmed with set GPS coordinates. If CAG 130 is programmed with set GPS coordinates, CAG 130 will connect to communications channel 140 and transmit the set GPS coordinates instead of the current GPS coordinate along with the unique CAG identifier to server 110, as described above.

Server 110 receives the current or set GPS coordinates and unique CAG identifier from CAG 130 via communications channel 140, and stores the GPS coordinates in association with the unique CAG Identifier in database 114.

Step 320 comprises configuring a new construction site. First, a user connects to server 110 via client device 120 and sends a request to server 110 to create a new site. A request for a new site comprises a unique name by which to identify the site, and a GPS location of the site. In response to receiving the request to create a new site, server 110 will store the site name and GPS coordinates in database 114, and query database 114 for any unassigned CAGs with GPS locations proximate to the GPS coordinates of the new site. Proximate may mean within a certain physical distance, for example 100 meters.

Server 110 may also query database 114 for any assigned CAGs with GPS locations proximate to the GPS coordinates of the new site. Proximate may mean within a certain physical distance, for example 1 kilometer.

Client device 120 receives the list of proximate unassigned and assigned CAGs from server 110. The user selects a CAG from the received list of unassigned CAGs, and client device 120 transmits the selected CAG back to server 110. Server 110 updates database 114 to associate the selected CAG with the new site. The selected CAG may then be referred to as being assigned to the site.

Figure 5:
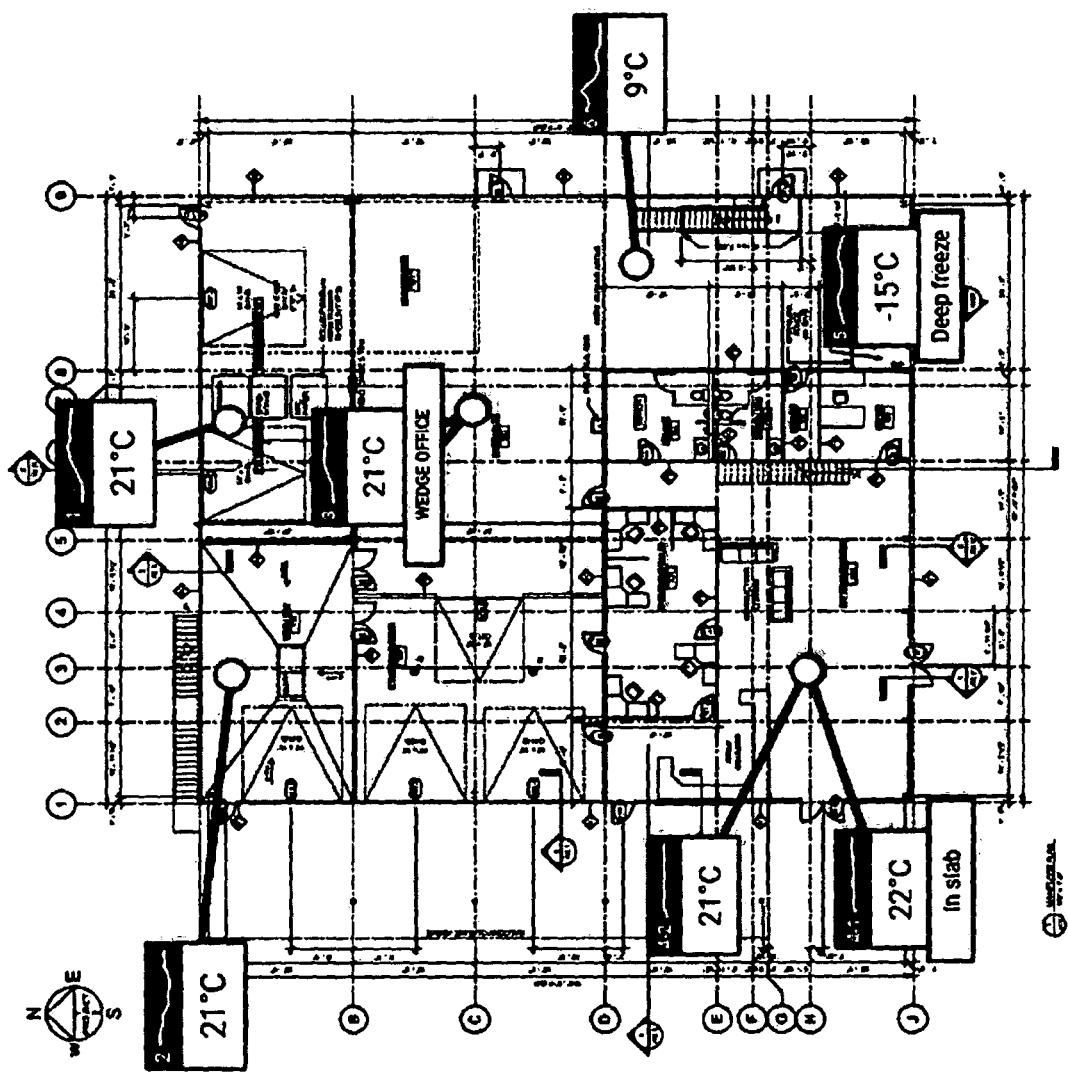
FIG. 5 depicts an example floorplan of a construction site according to an example embodiment.

Step 320 further comprises uploading a floor plan for construction site 135, and storing the floorplan in database 114 in association with the site. The floor plan is a schematic graphical representation of the site, an example of which is depicted in FIG. 5.

Step 330 comprises physically deploying one or more WSNs 150 and sensors 170 at construction site 135, and communicatively coupling WSNs 150 with CAG 130. WSNs 150 are deployed at locations of construction site 135 which facilitate deploying sensor 170 at construction site 135. For example, if a temperature of a concrete wall is to be measured, then one of WSNs 150 is deployed on or proximate the concrete wall. WSNs 150 may be physically deployed at construction site 135 by securing them to features of construction site 135, for example by affixing them to a wall or floor.

Once WSNs 150 are physically deployed at construction site 135, one or more sensors 170 are also deployed to measure an environmental condition of construction site 135.

Deploying the one or more sensors 170 may comprise affixing one or more of the sensors 170 to a feature of construction site 135, or embedding one or more of the sensors 170 within a feature of construction site 135. For example, arranging the one or more sensors 170 may comprise:

placing a sensor on a floor;
affixing a sensor to a ceiling;
inserting a sensor into a wall; or
inserting a sensor into a concrete formation.

Once the WSNs and sensors are deployed, step 340 comprises updating the site configuration to store an array of sensors of WSNs deployed at the site. The array of sensors includes a location of each sensor on the floorplan of the site. Step 340 further comprises updating the site map with the physical location of each sensor. FIG. 5 depicts an example of a site map with multiple deployed temperature sensors.

In some embodiments, a configuration of a site is stored in a database record, for example a JSON record. An example of a JSON record of a site is:

```
{
    "locations": [
        {
            "iot_id": "16075",
            "sub_id": "2",
            "name": "1-2"
        },
        {
            "iot_id": "16075",
            "sub_id": "0",
            "name": "1"
        },
        {
            "iot_id": "16075",
            "sub_id": "1",
            "name": "1-1"
        },
        {
            "iot_id": "16079",
            "name": "2"
        },
        {
            "iot_id": "27582",
            "name": "3"
        },
        {
            "iot_id": "26762",
            "name": "CAG"
        }
    ],
    "company_id": "NkNjNHF1SGWv_373Xp2o_g",
    "alerting": {
        "text_url": "https://dev.wedgesystems.com",
        "antispam_interval": 30,
        "wsn": {
            "activity_timeout": 6,
            "enabled": true
        },
        "cag": {
            "activity_timeout": 20,
            "enabled": true
        }
    },
    "contacts": [
        {
            "user_id": "5DuQs3hHTbaQ5C9G8Z0JLg",
            "site_admin": false,
            "notifications": {
                "sms_enabled": true,
                "cag_alerts": true,
                "wsn_alerts": true,
                "threshold_alerts": {
                    "zones": [ ]
                }
            }
        }
    ],
    "xbee_network_id": "39E0",
    "zones": [ ],
    "id": "zT2rUy2QR8mblsg_myBEvg",
    "geolocation": {
        "lon": -114.08371230867124,
        "lat": 50.936749358262794
    },
    "name": "Example Site",
```

-continued

```
    "edited_by": "John Doe",
    "timestamp": "2018-03-09T21:21:00.797684Z"
}
```

Figure 4A:
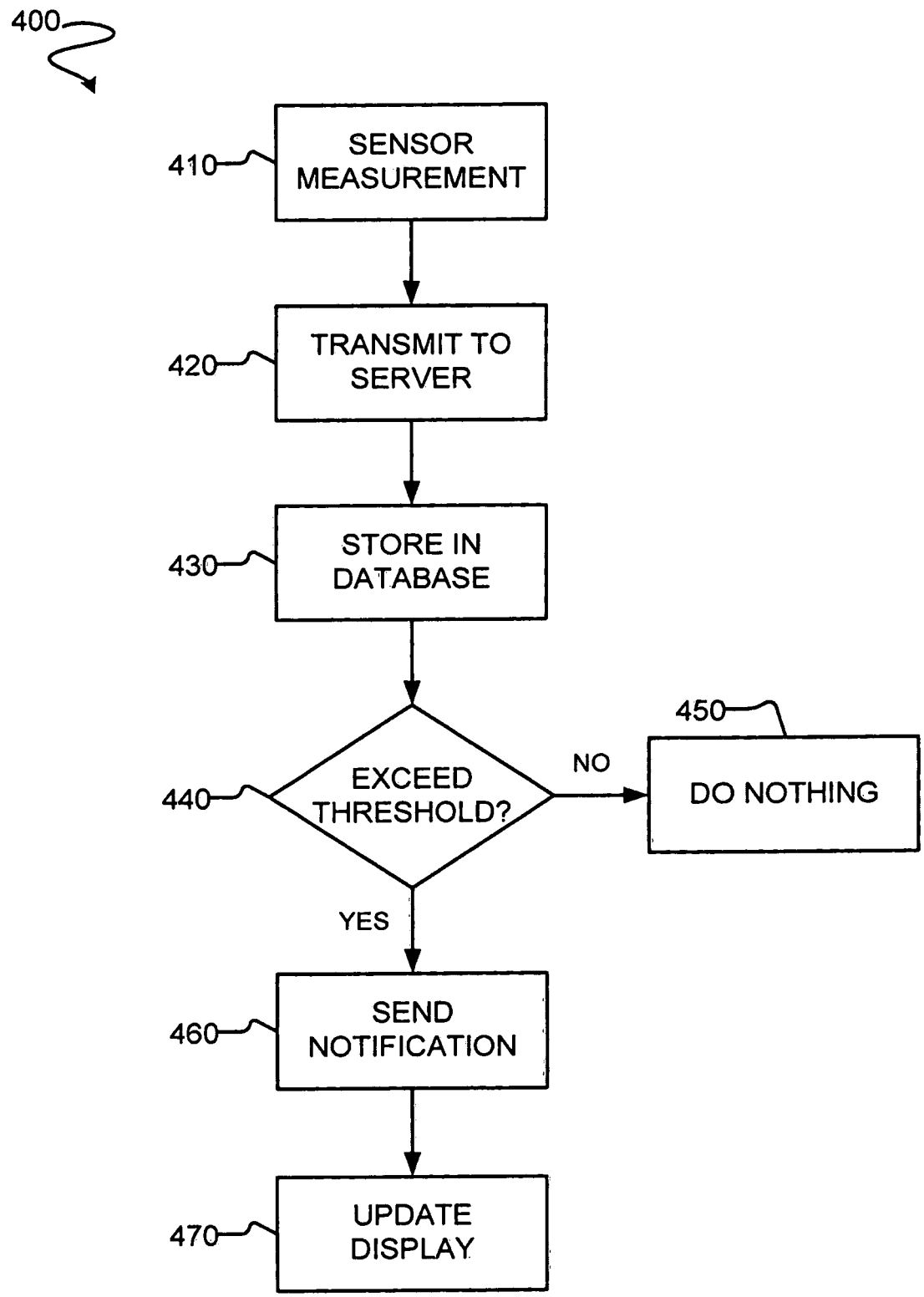
FIG. 4A depicts steps of a method for monitoring environmental conditions of a construction site according to an example embodiment.

FIG. 4A depicts a method 400 for monitoring a construction site, for example by using construction site monitoring system 100. Method 400 comprises:
- step 410 polling a sensor to receive a sensor measurement;
- step 420 transmitting the sensor measurement to a server;
- step 430 storing the sensor measurement in a database;
- step 440 determining if the sensor measurement exceeds a threshold;
- optional step 460 notification; and
- optional step 470 update display.

Step 410 comprises WSN 150 polling sensor 170 to measure an environmental condition of a construction site 135.

Step 420 comprises transmitting the sensor measurement to a server, for example by transmitting the sensor measurement from WSN 150 to CAG 130, and then from CAG 130 to server 110. In some embodiments, the internet is used to transfer the sensor measurement.

Step 430 comprises storing the sensor measurement in a database, for example server 110 storing the measurement in database 114.

Step 440 comprises determining if the sensor measurement exceeds a threshold. In some embodiments, the threshold is also stored in database 114. In other embodiments, the threshold is transmitted with the sensor measurement.

If the result of step 440 is that the measurement does not exceed the threshold, then no further action is taken 450.

If the result of step 440 is that the measurement exceeds the threshold, then the method proceeds to steps 460 and 470. Step 460 comprises sending a notification. In some embodiments, sending a notification 460 may comprise sending a message to a user, for example by SMS, email, or another electronic means. Step 470 comprises server 110 updating a display to indicate a threshold has been exceeded, for example by displaying a graphical indication.

Figure 4B:
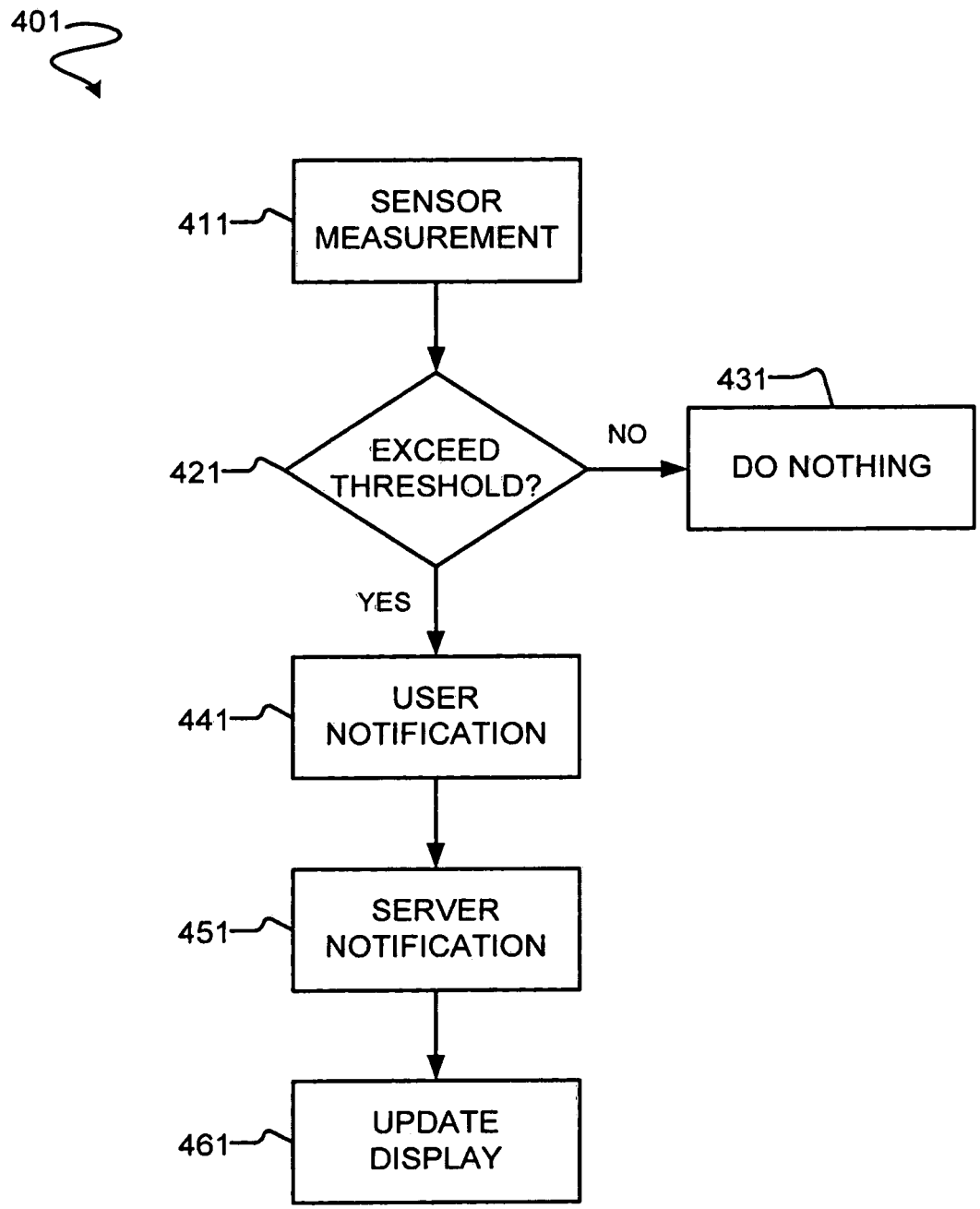
FIG. 4B depicts steps of a method for monitoring environmental conditions of a construction site according to an alternative example embodiment.

FIG. 4B depicts an alternative method 401 for monitoring a construction site, for example by using construction site monitoring system 101. Method 401 comprises:
- step 411 polling a sensor to receive a sensor measurement;
- step 421 determining if the sensor measurement exceeds a threshold;

and optionally:
- step 441 user notification;
- step 451 server notification; and
- step 461 update display.

Step 411 comprises WSN 150 polling sensor 170 to measure an environmental condition of a construction site 135, and transmitting the sensor measurement from WSN 150 to CAG 130.

Step 421 comprises determining if the sensor measurement exceeds a threshold. In some embodiments, the threshold is also stored on CAG 130.

If the result of step 421 is that the measurement does not exceed the threshold, then no further action is taken 431.

If the result of step 421 is that the measurement exceeds the threshold, then the method proceeds to step 441, and notifying a user. In some embodiments, user notification step 441 may comprise sending a message to a user, for example by SMS, email, or another electronic means.

Step 451 comprises notifying server 110 that the measurement exceeds the threshold.

Step 461 comprises server 110 updating a display to indicate a threshold has been exceed, for example by displaying a graphical indication.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed In series, these processes or blocks may instead be performed in parallel, or may be performed at different times.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

The invention claimed is:

1. A system for monitoring environmental conditions during progression of construction of a construction site, wherein floorplans of the construction site change over time to reflect physical structural changes to the site made during construction, the system comprising:
    a computer server comprising a web server and a database;

a Coordinator and Aggregator Gateway (CAG) deployed at the construction site and in communication with the web server and a global position system (GPS) network;

one or more Wireless Sensor Nodes (WSNs) deployed at the construction site and in communication with the CAG, each of the WSNs comprising one or more sensors configured to measure an environmental condition of the construction site;

a site configuration record stored in the database, the site configuration record comprising:

a unique construction site identifier;

a construction site name;

a plurality of construction site floorplans, wherein a first floorplan describes a first structural state having a first configuration of sensors at a first time during construction, and a second floorplan having a second configuration of sensors depicts a second structural state at a second time during construction, wherein the second structural state differs from the first structural state by comprising physical structural changes to the site made during construction, and wherein the first configuration of sensors and second configuration of sensors is non-identical, and wherein the second floorplan shows a portion of a wall built during the course of construction, and further wherein the portion of a wall built during the course of the construction is not shown in the first floorplan;

GPS coordinates of the construction site;

an array of sensor records, each of the sensor records comprising:

a WSN identifier identifying the WSN which the sensor is in communication with;

a unique sensor identifier;

a sensor name; and a location of the sensor on the first floorplan or second floorplan, if the sensor exists on such floorplan;

an array of measurement records stored in the database, each of the measurement records comprising:

a measurement sensor identifier identifying one of the sensors;

a measurement value;

a measurement site identifier identifying the construction site; and a date and time;

a client device in communication with the web server;

a trigger condition stored in the database, the trigger condition comprising:

a trigger sensor identifier identifying one of the sensors;

a trigger threshold; and a client device identifier identifying the client device; and a monitoring module executed by the web server, the monitoring module configured to send a notification to the client device identified by the client device identifier in the trigger condition if any of the measurement records contain a measurement sensor identifier matching the trigger sensor identifier in the trigger condition, and if the measurement value in the measurement record with the measurement sensor identifier matching the trigger sensor identifier exceeds the trigger threshold in the trigger condition.

2. The system of claim 1 further comprising:

a display module executed by the web server, the display module configured to, in response to a request from the client device, transmit a first floorplan and a second floorplan, and a graphical representation of one or more of the measurement records in the array of measurement records to the client device.

3. The system of claim 2 wherein the graphical representation of one or more of the measurement records comprises a chart of measurement records for a sensor over time.

4. The system of claim 1, wherein the web server, the CAG, and the client device are in communication via the Internet.

5. The system of claim 1, wherein the CAG and the one or more WSNs are in communication via a wireless mesh network, and each of the CAG and the one or more WSNs form a node in the wireless mesh network.

6. The system of claim 1, wherein each of the one or more sensors is powered by one of the one or more WSNs.

7. The system of claim 1, wherein one of the sensors is configured to measure an ambient temperature of the construction site.

8. The system of claim 1, wherein one of the sensors is configured to measure a temperature of a wall, a floor, or a ceiling of the construction site.

9. The system of claim 1, wherein one of the sensors is configured to measure an ambient humidity of the construction site.

10. The system of claim 1, wherein one of the sensors is configured to measure a concentration of a gas in the atmosphere of the construction site.

11. The system of claim 10, wherein the gas is one of carbon monoxide, carbon dioxide, methane, and propane.

12. The system of claim 1, wherein one of the sensors is configured to measure a presence of water at a location of the construction site.

13. The system of claim 1, wherein one of the sensors is configured to measure a moisture content at a location of the construction site.

14. The system of claim 1, wherein one of the WSNs is configured to measure a battery level of a battery of one of the WSNs.

15. The system of claim 1, wherein the notification to the client device notifies of a temperature measurement exceeding a threshold, a temperature measurement exceeding a threshold for a period of time, a humidity measurement dropping below a threshold, a humidity measurement dropping below a threshold level for a period of time, a battery level dropping below a threshold level, or a WSN losing connection with a sensor for a period of time.

16. A method of monitoring environmental conditions at a construction site, the method comprising:

a Wireless Sensor Node (WSN) polling a sensor to generate an environmental measurement;

the WSN transmitting the environmental measurement to a Coordinator and Aggregator Gateway (CAG);

the CAG comparing the environmental measurement to a threshold;

the CAG sending a first notification to a user device and a second notification to a server if the environmental measurement exceeds the threshold; and the server displaying a graphical indicator that the environmental measurement exceeds the threshold, if the server receives the second notification from the CAG, wherein a first floorplan describes a first structural state having a first configuration of sensors at a first time during construction, and a second floorplan having a second configuration of sensors depicts a second structural state at a second time during construction, wherein the second structural state differs from the first structural state by comprising physical structural changes to the site made during construction, and wherein the first configuration of sensors and second configuration of sensors is nonidentical, and wherein the second floorplan shows a portion of a wall built during the course of construction, and further wherein the portion of a wall built during the course of the construction is not shown in the first floorplan;

a client device in communication with the web server;

a trigger condition stored in the database, the trigger condition comprising:
  a trigger sensor identifier identifying one of the sensors;
  a trigger threshold; and
  a client device identifier identifying the client device; and a monitoring module executed by the web server, the monitoring module configured to send a notification to the client device identified by the client device identifier in the trigger condition if any of the measurement records contain a measurement sensor identifier matching the trigger sensor identifier in the trigger condition, and if the measurement value in the measurement record with the measurement sensor identifier matching the trigger sensor identifier exceeds the trigger threshold in the trigger condition.

17. The method of claim 16, wherein the WSN transmits the environmental measurement to the CAG via a wireless mesh network.

18. The method of claim 16, wherein the CAG sends the first notification to the user device and the second notification to the server via the Internet.

19. The method of claim 16, comprising providing power to the sensor by the WSN.

20. The method of claim 16, wherein the environmental measurement is an ambient temperature of the construction site.

21. The method of claim 16, wherein the environmental measurement is a temperature of a wall, a floor, or a ceiling of the construction site.

22. The method of claim 16, wherein the environmental measurement is an ambient humidity of the construction site.

23. The method of claim 16, wherein the environmental measurement is a concentration of a gas in the atmosphere of the construction site.

24. The method of claim 23, wherein the gas is one of carbon monoxide, carbon dioxide, methane, and propane.

25. The method of claim 16, wherein the environmental measurement is a presence of water at a location of the construction site.

26. The method of claim 16, wherein the environmental measurement is a moisture content at a location of the construction site.

27. A computer software program embedded in a non-transitory computer readable medium for monitoring environmental conditions at a construction site according to the method of claim 16.

28. A method of monitoring environmental conditions at a construction site, the method comprising:
  a Wireless Sensor Node (WSN) polling a sensor to generate an environmental measurement;
  the WSN transmitting the environmental measurement to a Coordinator and Aggregator Gateway (CAG);
  the CAG transmitting the environmental measurement to a server; the server comparing the environmental measurement to a threshold;
  the server sending a notification to a user device if the environmental measurement exceeds the threshold;
  the server displaying a graphical indicator that the environmental measurement exceeds the threshold if the environmental measurement exceeds the threshold, wherein a first floorplan describes a first structural state having a first configuration of sensors at a first time during construction, and a second floorplan having a second configuration of sensors depicts a second structural state at a second time during construction, wherein the second structural state differs from the first structural state by comprising physical structural changes to the site made during construction, and wherein the first configuration of sensors and second configuration of sensors are non-identical, and wherein the second floorplan shows a portion of a wall built during the course of construction, and further wherein the portion of a wall built during the course of the construction is not shown in the first floorplan;

a client device in communication with the web server;

a trigger condition stored in the database, the trigger condition comprising:
  a trigger sensor identifier identifying one of the sensors;
  a trigger threshold; and
  a client device identifier identifying the client device; and a monitoring module executed by the web server, the monitoring module configured to send a notification to the client device identified by the client device identifier in the trigger condition if any of the measurement records contain a measurement sensor identifier matching the trigger sensor identifier in the trigger condition, and if the measurement value in the measurement record with the measurement sensor identifier matching the trigger sensor identifier exceeds the trigger threshold in the trigger condition.

* * * * *